United States Patent
Chang et al.

(10) Patent No.: US 7,118,680 B2
(45) Date of Patent: Oct. 10, 2006

(54) SELF-ALIGNMENT SCHEME FOR ENHANCEMENT OF CPP-GMR

(75) Inventors: Jei-Wei Chang, Cupertino, CA (US); Chao-Peng Chen, Fremont, CA (US); Min Li, Fremont, CA (US); Kochan Ju, Monte Sereno, CA (US)

(73) Assignee: Headway Technologies, Inc., Milpitas, CA (US)

( * ) Notice: Subject to any disclaimer, the term of this patent is extended or adjusted under 35 U.S.C. 154(b) by 236 days.

(21) Appl. No.: 10/718,372

(22) Filed: Nov. 20, 2003

(65) Prior Publication Data

US 2005/0111143 A1    May 26, 2005

(51) Int. Cl.
  *G11B 5/39*    (2006.01)
(52) U.S. Cl. ............... 216/22; 216/40; 216/67; 29/603.18; 204/192.34; 430/296
(58) Field of Classification Search ............ None
  See application file for complete search history.

(56) References Cited

U.S. PATENT DOCUMENTS

| | | | | |
|---|---|---|---|---|
| 5,627,704 A | 5/1997 | Lederman et al. | ......... | 360/113 |
| 5,668,688 A | 9/1997 | Dykes et al. | ............. | 360/113 |
| 6,002,553 A | 12/1999 | Stearns et al. | ............. | 360/113 |
| 6,134,089 A | 10/2000 | Barr et al. | .................. | 360/322 |
| 6,222,707 B1 * | 4/2001 | Huai et al. | ............... | 360/324.1 |
| 6,353,318 B1 * | 3/2002 | Sin et al. | .................... | 324/252 |
| 6,496,333 B1 * | 12/2002 | Han et al. | ................... | 360/315 |
| 6,636,400 B1 * | 10/2003 | Pinarbasi et al. | ...... | 360/324.12 |
| 6,757,144 B1 * | 6/2004 | Carey et al. | ............. | 360/324.2 |
| 6,819,532 B1 * | 11/2004 | Kamijo | .................. | 360/324.11 |
| 6,821,715 B1 * | 11/2004 | Fontana, Jr. et al. | ........ | 430/320 |
| 7,016,168 B1 * | 3/2006 | Li et al. | ................ | 360/324.12 |
| 2004/0114284 A1 * | 6/2004 | Rachid et al. | ......... | 360/324.11 |

OTHER PUBLICATIONS

Co-pending U.S. Appl. No. 10/392,118, filed Mar. 19, 2003, same assignee, "GMR Improvement in CPP Spin Valve Head by Inserting a Current Channeling Layer (CCL)".
Co-pending U.S. Appl. No. 10/718,373, filed Nov. 20, 2003, same assignee, "Method of Increasing CPP GMR in a Spin Valve Structure.", now U.S. 7,016,168.

* cited by examiner

*Primary Examiner*—Anita Alanko
(74) *Attorney, Agent, or Firm*—Saile Ackerman LLC; Stephen B. Ackerman

(57) ABSTRACT

A method for fabricating a current-perpendicular-to-plane (CPP) giant magnetoresistive (GMR) sensor of the synthetic spin valve type is provided, the method including an electron-beam lithographic process employing both primary and secondary electron absorption and first and second self-aligned lift-off processes for patterning the capped ferromagnetic free layer and the conducting, non-magnetic spacer layer. The sensor so fabricated has reduced resistance and increased sensitivity.

14 Claims, 3 Drawing Sheets

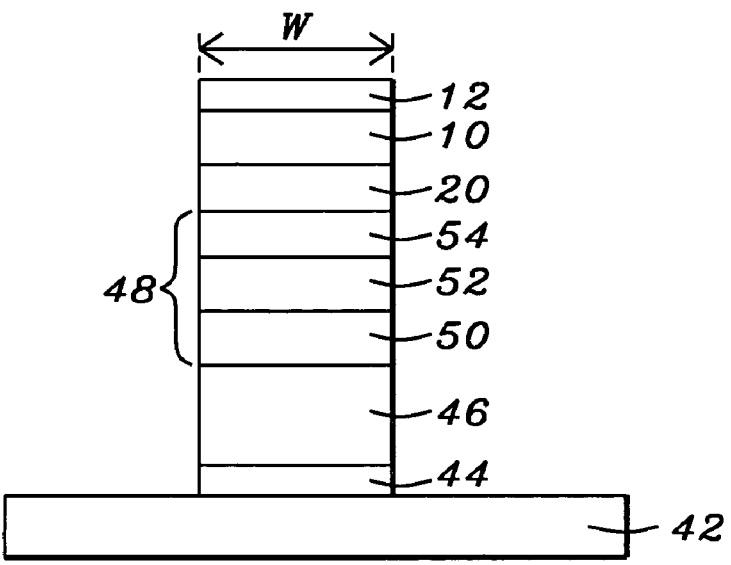
FIG. 1 - Prior Art
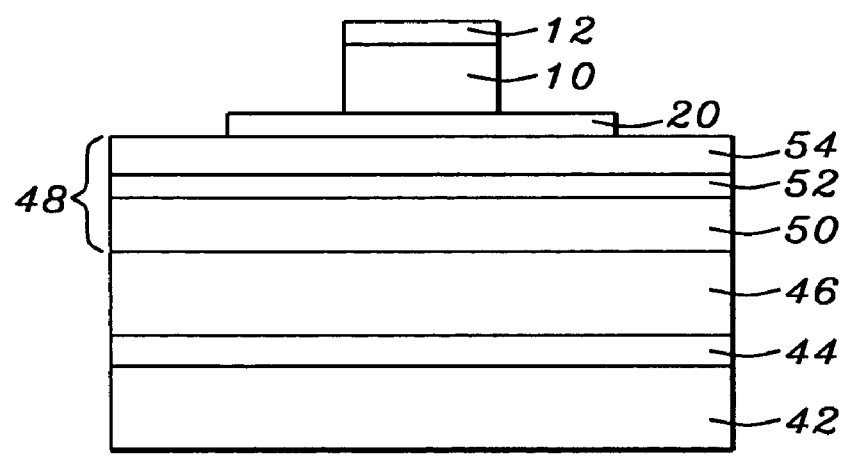
FIG. 2

SELF-ALIGNMENT SCHEME FOR ENHANCEMENT OF CPP-GMR

RELATED PATENT APPLICATION

This application is related to, Ser. No. 10/392,118 filing date Mar. 19, 2003, now issued as U.S. Pat. No. 7,040,005 and to, Ser. No. 10/718,373, filing date Nov. 20, 2003, now issued as U.S. Pat. No. 7,016,168 all assigned to the same assignee as the current invention.

BACKGROUND OF THE INVENTION

1. Field of the Invention

This invention relates generally to the fabrication of giant magnetoresistive (GMR) magnetic field sensors of a "current-perpendicular-to-the-plane" (CPP) configuration. More particularly, it relates to such a sensor that is geometrically patterned, using a single electron beam formed mask and a self-aligned double lift-off scheme, to lower its resistance and redistribute its current in a manner that increases sensor sensitivity and eliminates local hot-spots caused by excessive Joule heating.

2. Description of the Related Art

Magnetic read sensors that utilize the giant magnetoresistive (GMR) effect for their operation are generally of the "current-in-the-plane" (CIP) configuration, wherein current is fed into the structure by leads that are laterally disposed to either side of an active sensor region and the current moves through the structure essentially within the planes of its magnetic and other conducting layers. Since the operation of GMR sensors depends on the detection of resistance variations in their active magnetic layers caused by changes in the relative directions of their magnetic moments, it is important that a substantial portion of the current passes through those layers so that their resistance variations can have a maximally detectable effect. Unfortunately, CIP GMR sensor configurations typically involve layer stacks comprising layers that are electrically conductive but not magnetically active and that play no role in providing resistance variations. As a result, portions of the current are shunted through regions that produce no detectable responses and, thereby, the overall sensitivity of the sensor is adversely affected. The CPP sensor configuration avoids this current shunting problem by disposing its conducting leads vertically above and below the active sensor stack, so that all of the current passes perpendicularly through all of the layers as it goes from the lower to the upper lead. The CPP configuration thereby holds the promise of being effective in reading magnetically recorded media having recording densities exceeding 100 Gbit/in$^2$.

The CPP configuration is not without its problems, however. Whereas current in the CIP configuration passes through parallel conducting layers, in the CPP configuration it passes through such layers in series. The inherent problem in the CIP configuration is the loss of current (and sensitivity) through conductive, but non-magnetic layers; the analogous problem in the CPP configuration is the large voltage drop across magnetically inactive high resistance layers, which tends to mask the voltage variations produced by the active layers. The GMR resistance ratio, DR/R, is typically on the very low order of 1% for the CPP design, because the DR is provided by variations of the low resistance, magnetically active layers, whereas R includes the high resistance of inactive layers. It is worth noting that the high value of R also increases Joule heating in the sensor, causes local hot-spots and, therefore, limits the allowable magnitude of the sensing current.

GMR stack designs favor the use of magnetically pinned layers that are pinned by antiferromagnetic (AFM) pinning layers. Antiferromagnetic materials used in such pinning layers, together with their seed layers, tend to be formed of high-resistance materials and it is these layers that provide a parasitic resistance, $R_{pa}$, that is included in R and lowers the sensitivity, DR/R, of the CPP sensor.

One approach to alleviating this problem is to discover and use low-resistance AFM materials. This would necessitate a difficult materials search. An alternative approach is to lower the effective parasitic resistance of the AFM layer and other layers as well by changing their geometry. That is the approach taken by the present invention, particularly as relates to the fabrication of a synthetic spin valve configuration, i.e. a configuration in which the pinned layer comprises a pair of ferromagnetic layers with antiparallel magnetizations coupled by an appropriate material layer formed between them and held in that configuration by a pinning layer of antiferromagnetic material.

The pertinent prior art cited below has offered no similar method for improving the sensitivity of the CPP design having a synthetic spin valve stack configuration. Lederman et al. (U.S. Pat. No. 5,627,704) discloses a CPP GMR stack structure formed within a gap located in one of two pole layers of a magnetic yoke structure which also has a transducing gap formed in an ABS plane. The two pole pieces of the yoke serve to guide magnetic flux to the GMR stack which has current leads above and below it and permanent magnet biasing layers horizontally disposed on either side of it. Sin et al. (U.S. Pat. No. 6,353,318) provides a method for forming a CPP sensor having hard bias layers positioned so as not to allow shorting between the current carrying leads. Dykes et al. (U.S. Pat. No. 5,668,688) discloses a spin valve CPP configuration in which the active layers form a stack of uniform width disposed between upper and lower shield and conductor layers. Stearns et al. (U.S. Pat. No. 6,002,553) discloses a CPP 3-dimensional microarchitecture in which the stack layers are substantially rectangular in shape and of very small size (between 0.1 and 5 microns). Barr et al. (U.S. Pat. No. 6,134,089) discloses a CPP design in which the sensor leads are shaped to have low resistance without the necessity of an increase in spacing between the upper and lower magnetic shields between which the sensor stack is disposed.

The prior art cited above does not discuss or disclose a method of forming a CPP GMR sensor in which the geometry of the various layers permits a re-distribution of current within the sensor stack that effectively reduces its resistance and thereby increases it sensitivity.

SUMMARY OF THE INVENTION

Accordingly, it is a first object of this invention is to provide an efficient and accurate method to fabricate a novel current-perpendicular-to-plane (CPP) giant magnetoresistive (GMR) read-sensor stack structure of a synthetic spin valve configuration, having decreased resistance and improved sensitivity.

It is a second object of this invention to provide a method to fabricate such a sensor stack structure wherein the current path through said sensor stack does not produce local hot spots due to increased Joule heating effects.

It is a third object of the present invention to teach the use of combined direct and backscattered electron beam exposure of a photoresistive layer as a method of forming a mask and transferring patterns to a substrate.

It is a fourth object of the present invention to provide a multi-region electron-beam mask whose formation makes advantageous use of direct and backscattered electron-beam lithography.

It is a fifth object of the present invention to provide the sensor fabricated using the methods of the present invention.

The objects stated above will be achieved by the application of a novel fabrication method to a CPP synthetic spin valve design disclosed in related patent application, Ser. No. 10/718,373, filing date Nov. 20, 2003, now issued as U.S. Pat. No. 7,016,168, assigned to the same assignee as the present invention and fully incorporated herein by reference. For reference, there is shown in FIG. 1 a schematic of a prior art CPP GMR stack in which the stack formation comprises successive layers of uniform width formed on a conducting lead layer (42) of greater width than the stack layers. The layers include a seed layer (44), an antiferromagnetic pinning layer (46), a synthetic antiferromagnetic pinned layer (48) further comprising a second ferromagnetic layer (denoted AP2) (50), a coupling layer (52) and a first ferromagnetic layer (AP1) (54), a second Cu spacer layer (20), a ferromagnetic free layer (10) and a Cu capping layer (12). The width of the layers (W) are identical and the stack is, thereby, of uniform width. In contrast, there is shown in FIG. 2 the CPP structure to be formed in the present invention and by use of its methods. That structure provides a low resistance current path by means of a novel design in which a ferromagnetic free layer (10) and Cu capping layer (12) of small dimension (<0.1 micron), is formed on a Cu spacer layer (20) of slightly larger dimension (approximately 0.3 microns) and that spacer layer is formed on a GMR stack (40) of synthetic spin valve configuration having equal, uniform layer dimensions that were larger that either of the above (>0.3 microns). The GMR stack includes a lead layer (42), a seed layer (44), an antiferromagnetic pinning layer (46), and a synthetic antiferromagnetic pinned layer (48), further comprising a second ferromagnetic layer (denoted AP2) (50), a coupling layer (52) and a first ferromagnetic layer (AP1) (54). The resultant resistance of such a stack is greatly reduced (as is fully disclosed in related applications Ser. No. 10/392,118, filing date Mar. 19, 2003, now issued as U.S. Pat. No. 7,040,005 and, Ser. No. 10/718,373, filing date Nov. 20, 2003, now issued as U.S. Pat. No. 7,016,168, both assigned to a common assignee, fully incorporated herein by reference) compared to the prior art stack of uniform dimension shown in FIG. 1. In addition, the sensitivity of such a stack is retained even with the use of the small Cu spacer layers (20), since the spin diffusion length of electrons in Cu (the distance an electron can travel with its spin direction unchanged) is approximately 1500 angstroms. Therefore, the DR of the sensor (resistance change between parallel and antiparallel orientations of free and pinned layer magnetizations) is not changed, but the total resistance, R, is significantly reduced, so the GMR sensitivity, DR/R is increased. In addition, the reduced resistance and elimination of hot spots allows a greater sensor current to be applied, increasing signal strength and further improving the sensitivity of the sensor.

To maximize DR/R in the sensor stack of FIG. 2, it is necessary to precisely pattern and align the sub-micron Cu capping layer (12) and ferromagnetic free layer (10) upon the second, wider, Cu spacer layer (20). The required patterning and alignment is accomplished in a self-aligned process using a single mask formed of a double layer of resistive material by an electron-beam lithographic process that is made possible by a combination of direct and backscattered electron-beam exposure. (the proximity effect (PE)) and a subsequent double lift-off process using said mask.

BRIEF DESCRIPTION OF THE DRAWINGS

FIG. 1 is a schematic cross-sectional view through the air-bearing surface (ABS) of a prior art CPP GMR sensor configuration of the synthetic spin valve type.

FIG. 2 is a similar schematic cross-sectional view through the ABS of the CPP GMR configuration of the present invention.

DESCRIPTION OF THE PREFERRED EMBODIMENTS

The present invention is a novel, efficient electron beam lithographic method to pattern and self-align a very small ferromagnetic free layer on a larger spacer layer and to fabricate, thereby, a CPP GMR sensor of the synthetic spin valve type which has an increased GMR sensitivity, DR/R, as a result of a lowered resistance, R, and a capability of using a greater sensor current to increase signal strength.

Referring again to FIG. 2, there is shown a schematic view of the CPP GMR sensor to be formed using the novel fabrication scheme of the present invention. Particular attention is to be paid to the sub-micron ferromagnetic free layer (10) and the Cu capping layer formed on it (12). It is critical to the operation of the sensor that those layers be accurately patterned and positioned on the Cu spacer layer (20) beneath them. The positioning involves centering the capping layer (12) and free layer (10) on the spacer layer (20) so that the spacer layer forms a substantially uniform border extending beyond the periphery of the free layer.

Figure 3:
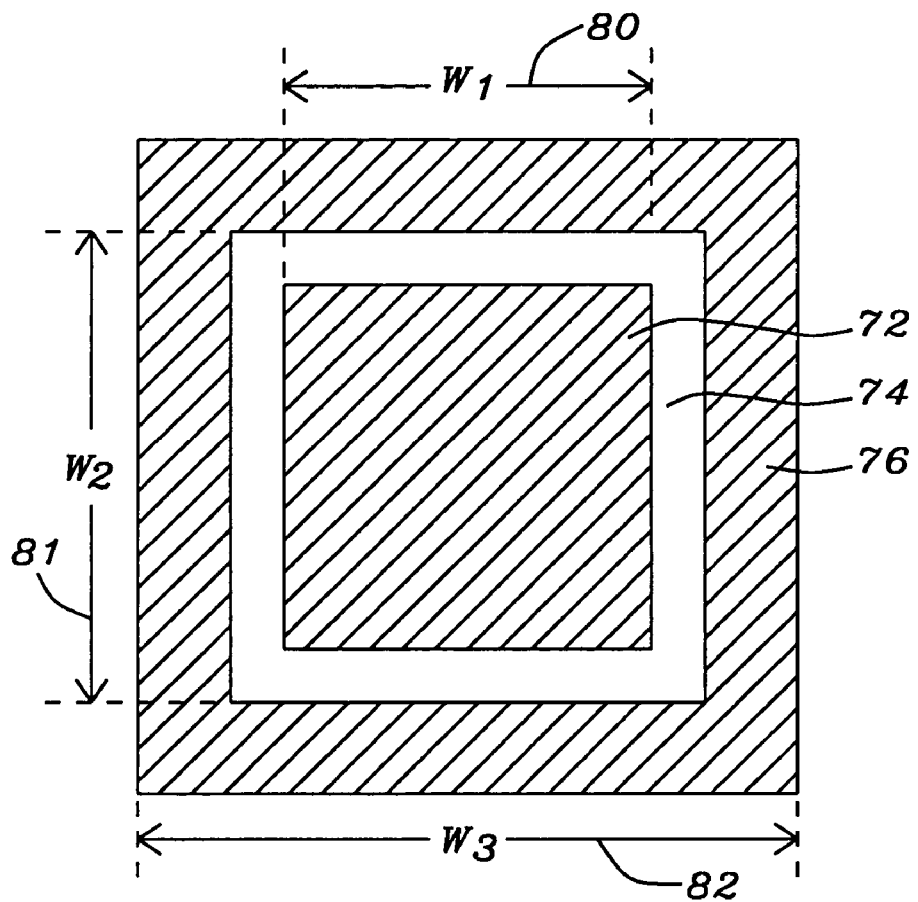
FIG. 3 shows a schematic (overhead) view of the mask used to pattern and align the free layer on the spacer layer.

Referring now to FIG. 3, there is shown a novel lithographic mask that, in the present invention, will be formed by the application of electron-beam lithography to a double photoresistive layer formed on the upper surface of the GMR sensor stack (i.e. the sequence of layers). This mask will then be used to pattern and properly align the free layer on the spacer layer using a double lift-off process described below. The design of the mask also determines the horizontal cross-sectional shape of the free layer as well as that of the spacer layer. In this embodiment, the mask comprises three concentric regions with substantially square perimeters: a first region, which is a substantially square center box region (72), surrounded concentrically by a second region, which is a spacer region (74) forming a moat-like space with square inner and outer perimeters around the center box region, with both box region (72) and spacer region (74) being further concentrically surrounded by a third region, which is a line region (76) forming a frame with square inner and outer perimeters around the center box region and its surrounding spacer region. The process by which the mask is formed comprises the following sequence of steps, which will be described in fuller detail below: 1) sequentially coating the upper surface of the GMR stack with two photoresistive layers; 2) using directly absorbed electron beams to expose the layers in the frame (76) and center box (72) regions; 3) using backscattered electrons to partially expose the spacer region; 4) baking and developing the exposed layers to form the mask and to remove regions external to it.

The width of the center box region, $W_1$, denoted by the double ended arrow (80), is the critical dimension (CD) of the ferromagnetic free layer and is preferably between approximately 0.05 and 0.15 microns. The shape of the box region is the required horizontal cross-sectional shape of the free layer. The outer width of the spacer region, $W_2$, denoted by arrow (81), is between approximately 0.05 and 0.2 microns and the outer width of the line region, $W_3$, denoted by arrow (82), is between approximately 0.05 and 0.2 microns. The outer width of the surrounding line region is also the CD of the spacer layer on which the free layer will be patterned and positioned. The single mask thereby provides the patterning of both the spacer layer and the capped free layer. It is to be noted that the mask may be modified by the formation of additional space and line regions beyond the single one disclosed herein. Such further regions may be used if the required patterning involves the formation of additional regions of various shapes. The formation and use of the mask in FIG. 3 to pattern and align the free layer on the spacer layer will now be fully described and illustrated by reference to FIGS. 4–8.

Figure 4:
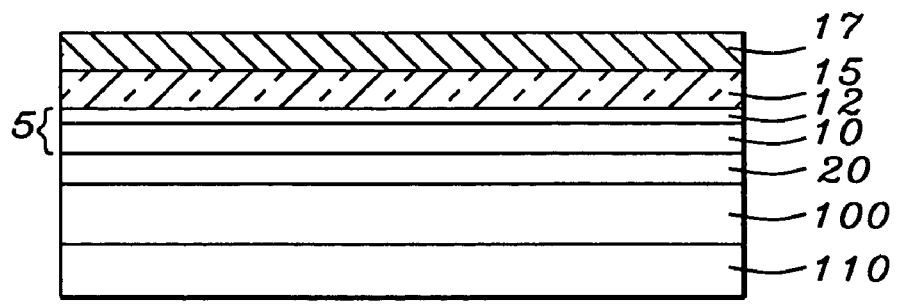
FIGS. 4–8 are schematic illustrations of process steps, including forming the mask of FIG. 3 and using the mask to pattern and align the free layer on the spacer layer.

Referring first to FIG. 4, there is seen an initial GMR synthetic spin valve stack formation prior to the patterning of any of its layers. The stack formation comprises a substrate (110), which in this embodiment is an AlTiC substrate. On this substrate there is formed a CPP GMR multi-layered laminate (100), whose detailed layer structure is the same as illustrated in FIG. 2 and described above, but which is not shown herein as it is unnecessary to the description of the patterning method. On the CPP GMR laminate (100) there is then formed a conducting, non-magnetic spacer layer (20), which in this embodiment is a layer of Cu formed to a thickness of between approximately 15 and 60 angstroms. On the spacer layer there is then formed a capped layer of ferromagnetic material (5), which will become the ferromagnetic free layer and which in this embodiment is a layer (10) of CoFe formed to a thickness between approximately 10 and 80 angstroms on which there is formed a conducting, non-magnetic capping layer (12), which in this embodiment is a layer of Cu of thickness between approximately 10 and 300 angstroms. For simplicity, the two layers (10) and (12) will be hereinafter referred to and shown as a single capped free layer (5). In preparation for the patterning by the novel method of this invention, two layers of photoresistive material, of different properties, are formed sequentially (upper layer on lower layer) over the capped layer (5). The lower photoresistive layer (15) is preferentially a layer of PMGI resist formed to a thickness of between approximately 30 and 200 nanometers (nm.), with approximately 50 nm. being preferred. The upper resistive layer (17) is preferentially a negative tone photoresist, such as the commercially available trademarked brand NEB22 manufactured by Sumitomo Chemical Co, formed to a thickness between approximately 100 and 300 nm., with 200 nm. being preferred. The two resistive layers are baked to remove incorporated solvents, the first layer being baked after its formation at 180° C. for approximately 5 minutes, then the second is baked after its formation at approximately 100° C. for approximately 2 minutes.

Figure 5:
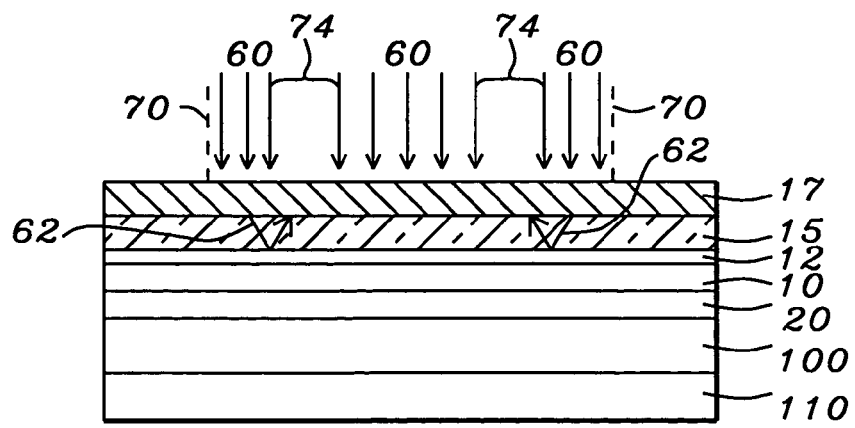

Referring next to FIG. 5, there is shown the patterning of the upper resistive layer (17) by exposure to an electron-beam (arrows, (60)) applied to the upper resistive layer in the required mask pattern (i.e., avoiding direct exposure of spacer region (74) and not exposing the photoresist beyond the boundary (lines(70)). Electron beam exposure of a negative tone resistive material (17) promotes a cross-linking of its polymeric molecules (subsequent to a post-baking) that increases their molecular weight and, in turn, hardens the material and renders it more resistant to dissolving in a developer. In addition to the primary electron beam exposure (60) of the negative tone resist, it is also exposed by electrons (arrows (62)) backscattered from the material surface beneath the resistive layers. Such backscattered electron exposure is called the proximity effect (PE) and it produces a partial exposure (and consequent partial cross-linking and partial hardening) of the portion of the resistive layer (17) beneath the spacer (74) portion of the mask. This region is not affected by the primary electron beam. The required degree of partial exposure can be calculated from mask parameters and electron-beam dose. The novel and advantageous design of the mask has resulted from the use of both a primary electron beam and a back-scattered beam to form the required pattern in the resistive layers and to further permit the eventual double lift-off process described below.

Figure 6:
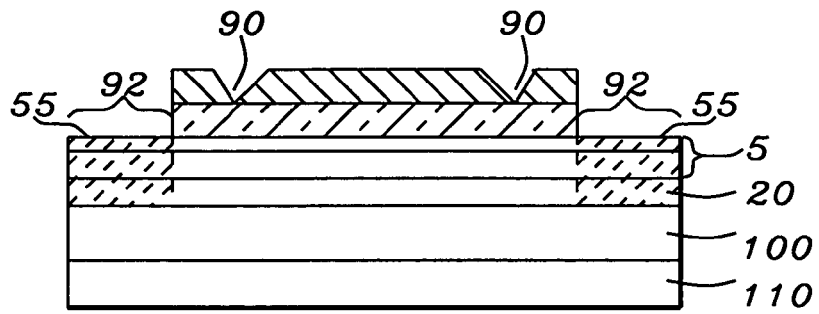

Referring next to FIG. 6, there is shown a schematic illustration of the resistive layers subsequent to a post-exposure bake and development. The region of the negative tone resistive material (the commercially available NEB22 in this embodiment) that is external to the mask region and has received neither direct nor backscattered electron-beam exposure (92), has been completely removed by development as has the PMGI layer beneath it. The region that received partial exposure from the proximity effect (PE) and was only partially hardened has, thereby, been only partially removed (90) by development, leaving a remaining portion of sufficiently reduced thickness to allow its complete removal by subsequent ion-beam etching (IBE) as described below. A portion (shown shaded) (55) of the capped free layer (5) exposed by development and removal of the resistive layers (92) and a corresponding portion (shown shaded) of the spacer layer (20) beneath that first portion, can now both be removed by a first etching process, preferably an ion-beam etch (IBE) or reactive ion etch (RIE). This etching process exposes the upper surface of the GMR laminate (not shown in its entirety). The spacer layer (20) has now been properly patterned and reduced to its correct dimensions, but it is still covered by the free layer remaining above it.

Figure 7:
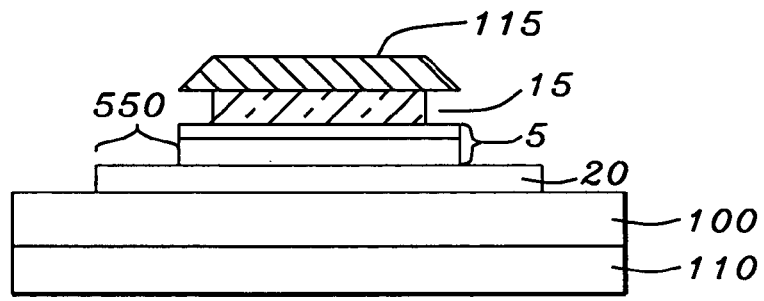

Referring next to FIG. 7, there is shown a schematic of the fabrication at the beginning of the first lift-off process. This process begins with a second etching process, preferably an ion-beam etch (IBE) or RIE, which penetrates through the region of reduced thickness of the negative tone resist ((90) in FIG. 6). This second etch also passes through the PMGI layer (15) beneath the negative tone resist and both layers of resist are lifted off by application of developer to the PMGI layer. This completes the first lift-off process. The exposed first portion of the capped ferromagnetic free layer (5) is then etched away (removed region shown as (550)) by an etch process, which is a continuation of the IBE or RIE of the second etch process and is self-aligned by the remaining upper portion of the resistive layers (115). This etch stops at the Cu spacer layer (20) and leaves the fabrication as shown in the figure. Thus, the ferromagnetic free layer is now correctly patterned by this etch while the already correctly patterned Cu spacer layer is not affected by this etch. The previous application of the developing solution has also undercut the PMGI layer (15) beneath (115), to facilitate the eventual lift-off of this remaining portion of negative tone resist layer. This final removal will constitute the second lift-off process.

Figure 8:
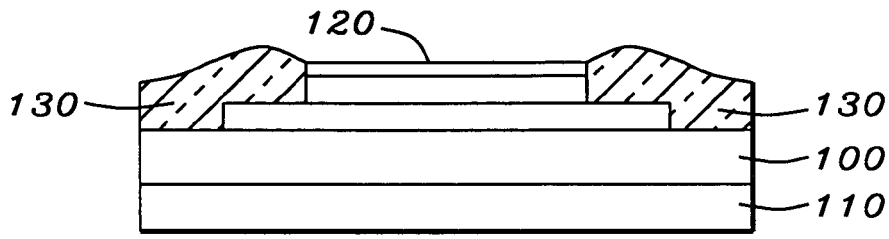

Referring next to FIG. 8, there is shown a schematic view of the fabrication of FIG. 7 wherein that fabrication has been refilled, as shown, with an insulating layer, such as a layer of alumina (130), which is deposited over the spacer layer (20) to abut the lateral edges (131) of the capped free layer. Subsequent to this refill, the second lift-off process is completed, which is the removal of the remaining portion of the negative tone resistive material and undercut PMGI layer (shown in FIG. 7 as (15) and (115)) to expose the correctly patterned capped ferromagnetic free layer (120). This removal can be facilitated by the application of a solvent such as N-methyl-2-pyrrolidone (NMP) to dissolve the PMGI layer. A top conducting lead (not shown) can now be formed to contact the upper surface of the capped ferromagnetic layer.

As is understood by a person skilled in the art, the preferred embodiment of the present invention is illustrative of the present invention rather than limiting of the present invention. Revisions and modifications may be made to methods, materials, structures and dimensions employed in this method for fabricating CPP sensors of the synthetic spin valve type having reduced resistance and increased sensitivity, while still providing a method for fabricating CPP sensors of the synthetic spin valve type having reduced resistance and increased sensitivity as described herein, in accord with the spirit and scope of the present invention as defined by the appended claims.

What is claimed is:

1. A method for fabricating CPP GMR sensors of the synthetic spin valve type comprising:
   providing a substrate;
   forming on said substrate a GMR sensor stack of the synthetic spin valve type;
   forming on said GMR sensor stack a conducting non-magnetic spacer layer;
   forming on said spacer layer a capped ferromagnetic free layer, said free layer comprising a ferromagnetic layer on which is formed a conducting, non-magnetic capping layer;
   patterning said spacer layer and capped ferromagnetic free layer and forming an insulating layer over said spacer layer, while using a single mask, self-aligned first and second lift-off process, said mask being formed by an electron-beam lithographic process employing primary and backscattered electron absorption.

2. The method of claim 1 wherein said single mask is formed by a process comprising:
   forming a photoresistive double layer on said capped ferromagnetic layer, said double layer comprising a lower layer and an upper layer formed on said lower layer, wherein said upper layer is formed of a material that, upon electron absorption and subsequent heat treatment, is hardened and thereby made resistant to dissolution by a developing solution;
   forming, by electron-beam lithography and subsequent heat treatment, a mask in a central portion of said resistive double layer, said mask comprising a first region of said upper layer which has been hardened by the direct absorption of electrons from said electron beam, a second region which surrounds the first region and which has been partially hardened by the absorption only of electrons backscattered from said capped ferromagnetic region and a third region, which has been hardened by the direct absorption of electrons from said electron beam and surrounds both said first and second mask regions;
   developing and completely removing all of said resistive double layer which is external to said third region and which has absorbed no electrons, said removal exposing a corresponding region of the capped ferromagnetic layer and said developing partially removing said second upper layer region, said second region having absorbed the lesser, backscattered portion of said electron beam and being only partially hardened thereby.

3. The method of claim 2 wherein said resistive double layer comprises a lower layer of PMGI photoresistive material formed to a thickness between approximately 30 and 200 nm, upon which is formed an upper layer of negative tone photoresistive material.

4. The method of claim 2 wherein the first region of said mask is a two-dimensional region having a substantially square perimeter each of whose sides is of length between approximately 0.05 to 0.15 microns.

5. The method of claim 4 wherein the second region of said mask is a region of uniform width surrounding said first region, said second region having inner and outer perimeters which are substantially square, wherein said inner perimeter is contiguous with the perimeter of said first region and wherein said outer perimeter has sides of length between approximately 0.05 and 0.2 microns.

6. The method of claim 5 wherein the third region of said mask is a region of uniform width surrounding said second region, said third region having inner and outer perimeters which are substantially square, wherein said inner perimeter is contiguous with the outer perimeter of said second region and wherein said outer perimeter has sides of length between approximately 0.05 and 0.2 microns.

7. The method of claim 2 wherein said double lift-off process comprises:
   removing, using a first etching process, said exposed region of the capped ferromagnetic layer and a corresponding portion of the spacer layer beneath it, the remaining portion of the spacer layer now being properly patterned;
   lifting off said second and third regions of the resistive double layer using a second etching and dissolution process of said second mask region and exposing, thereby, a portion of said capped ferromagnetic layer beneath said second and third mask regions;
   removing said exposed portion of the capped ferromagnetic layer by continued use of said second etching process and with the first region of the upper resist layer providing self-alignment, the remaining portion of said capped ferromagnetic layer now being correctly patterned;
   forming an insulating layer over said spacer layer, said insulating layer abutting said capped ferromagnetic layer;
   lifting off the first region of said double resistive layer, exposing, thereby, the correctly patterned capped free layer.

8. The method of claim 7 wherein said first etching process is an ion-beam etch (IBE) or a reactive ion etch (RIE).

9. The method of claim 7 wherein said second etching and dissolution process comprises an ion-beam etch (IBE) or a reactive ion etch (RIE) to remove said second upper layer region and expose said lower layer region, followed by the application of developer to at least partially dissolve the portions of said lower layer region exposed by the removal of said upper layer region and facilitate removal of said third and first regions of the upper resist layer.

10. The method of claim 7 wherein the first region of said double resistive layer is lifted off by dissolution of the layer beneath it using the solvent N-methyl-2-pyrrolidone.

11. The method of claim 1 wherein said GMR sensor stack comprises:
 a seed layer;
 a pinning layer formed of an antiferromagnetic material formed on said seed layer;
 a synthetic antiferromagnetic pinned layer formed on said pinning layer, said pinned layer further comprising:
  a first ferromagnetic layer;
  an antiferromagnetically coupling layer;
  a second ferromagnetic layer; and
  the magnetizations of said first and second ferromagnetic layers being antiparallel.

12. The method of claim 1 wherein the spacer layer is a layer of Cu formed to a thickness between approximately 15 and 60 angstroms.

13. The method of claim 1 wherein the ferromagnetic free layer is a layer of CoFe formed to a thickness between approximately 10 and 80 angstroms.

14. The method of claim 1 wherein the capping layer is a layer of Cu formed to a thickness between approximately 10 and 300 angstroms.

* * * * *